Figure 1:
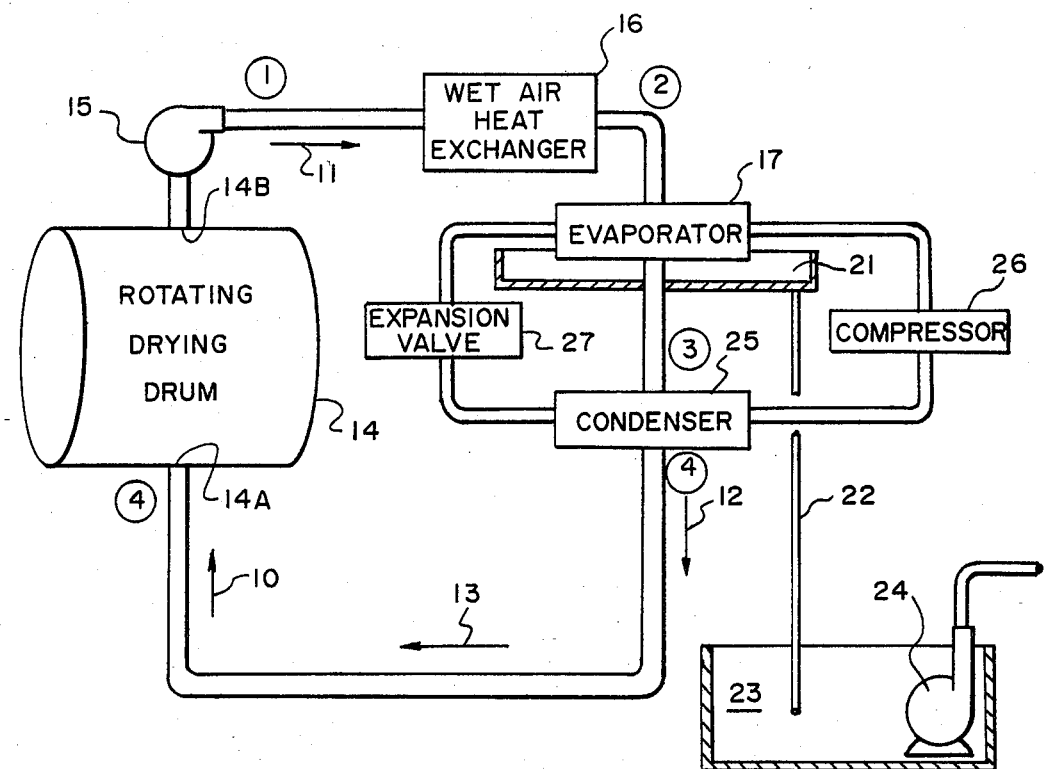

United States Patent [19]
Goldberg

[11] Patent Number: 4,603,489
[45] Date of Patent: Aug. 5, 1986

[54] HEAT PUMP CLOSED LOOP DRYING

[76] Inventor: Michael Goldberg, 118 Page Rd., Bedford, Mass. 01730

[21] Appl. No.: 657,896

[22] Filed: Oct. 5, 1984

[51] Int. Cl.⁴ ............................................. F26B 21/08
[52] U.S. Cl. .......................................... 34/77; 34/86; 34/133
[58] Field of Search ..................... 34/76, 77, 86, 133

[56]     References Cited
U.S. PATENT DOCUMENTS

| | | | |
|---|---|---|---|
| 2,627,669 | 2/1953 | Candor | 34/76 |
| 2,676,418 | 4/1954 | Shewmon | 34/77 |
| 3,064,358 | 11/1962 | Giuffre | 34/77 |
| 3,739,487 | 6/1973 | Clark | 34/77 |

FOREIGN PATENT DOCUMENTS 1138321  6/1957  France ..................... 34/77

Primary Examiner—Larry I. Schwartz
Attorney, Agent, or Firm—Charles Hieken

[57]     ABSTRACT

A dryer includes a rotating drum having an inlet and an outlet. A blower withdraws air from the outlet. A heat pump has an evaporator and condenser interconnected by a compressor and an expansion valve. The outlet of the condenser is connected to the inlet of the rotating drum. The water collection tray drains into a sump having a sump pump. In a closed loop form the outlet of the rotating drum is coupled to the inlet of the evaporator and is thermally coupled to a wet air heat exchanger.

4 Claims, 2 Drawing Figures

HEAT PUMP CLOSED LOOP DRYING

The present invention relates in general to drying and more particularly concerns novel apparatus and techniques for using a heat pump in a closed loop to dry items, such as clothes, with significantly less energy than a conventional dryer while subjecting the items being dried to lower temperatures to lessen heat damage.

A conventional clothes dryer uses direct heat, such as supplied by an electric or gas heating element, to force evaporation of the water in the clothes. Typically, a blower forces air heated by the heating element into a rotating drum that tumbles the clothes during the drying cycle. Typically, a vent exhausts the heated moistened air after only a single pass through the drum. This approach wastes considerable heat in raising the temperature of the clothes and water therein to the operating temperature of the dryer, and much heat escapes through the exhaust vent without significantly contributing to drying.

A typical residential clothes dryer dries 14 pounds of clothing containing about 8 pounds of water in about an hour. The theoretical amount of heat required to effect drying equals the heat of evaporation of the water, plus the sensible heat for raising the clothes to the operating temperature, typically 250° F. In this example, the heat of evaporation is about 7,600 BTU, and the sensible heat is about 1400 BTU, for a total of 9,000 BTU/hour, or 2600 watts. The actual heat input of a typical home clothes dryer however is 19,000 BTU/hour, or 5400 watts.

A search of subclasses 72, 77 and 78 of class 34 uncovered U.S. Pat. Nos. 3,645,772, 3,650,744, 3,839,037, 4,349,620, British Patent Document No. 2 002 891 A, French Pat. No. 1.028.699 and German Patent Document No. 22 20 425.

Of these patents, U.S. Pat. No. 3,739,487 is believed to be the most pertinent. This patent discloses a dryer having a compressor and evaporator with an additional condenser coil attached externally to the machine so that the portion of the heat pump output produced by this condenser coil does not reach the drying chamber or drum. This patent discloses a closed loop air path in which approximately ⅔ of the circulated air completely bypasses the evaporator coil. This patent teaches that without the additional condenser coil attached externally to the machine, the compressor will overheat and stop. This patent also teaches using the entire cabinet to radiate waste heat with the result that some heat is evacuated without extracting moisture. FIG. 8 of this patent indicates an ideal extraction rate of 1.25 pounds per hour, translating into a drying time of approximately four hours for an average load of laundry having five pounds of water, and nearly 6½ hours for the typical residential clothes dryer load mentioned above of 14 pounds of clothing containing about 8 pounds of water typically dried in an hour with a conventional clothes dryer.

It is an important object of this invention to provide improved methods and means of drying.

According to the invention, there is drying chamber means, such as a rotating drum. Means, including air circulating means for circulating air through the drying chamber means, forms a closed loop comprising also heat pump evaporating means for condensing moisture and heat pump condenser means for delivering heat to the air in the closed loop after the air releases moisture to the heat pump evaporating means. There is means for collecting the condensate provided by the heat pump evaporating means. The heat pump condensing and evaporating means comprise a closed heat pump loop system also including compressing means for compressing refrigerant and means for coupling the heat pump evaporating means and the heat pump condensing means, typically comprising a heat pump expansion valve or capillary tube.

Figure 2:
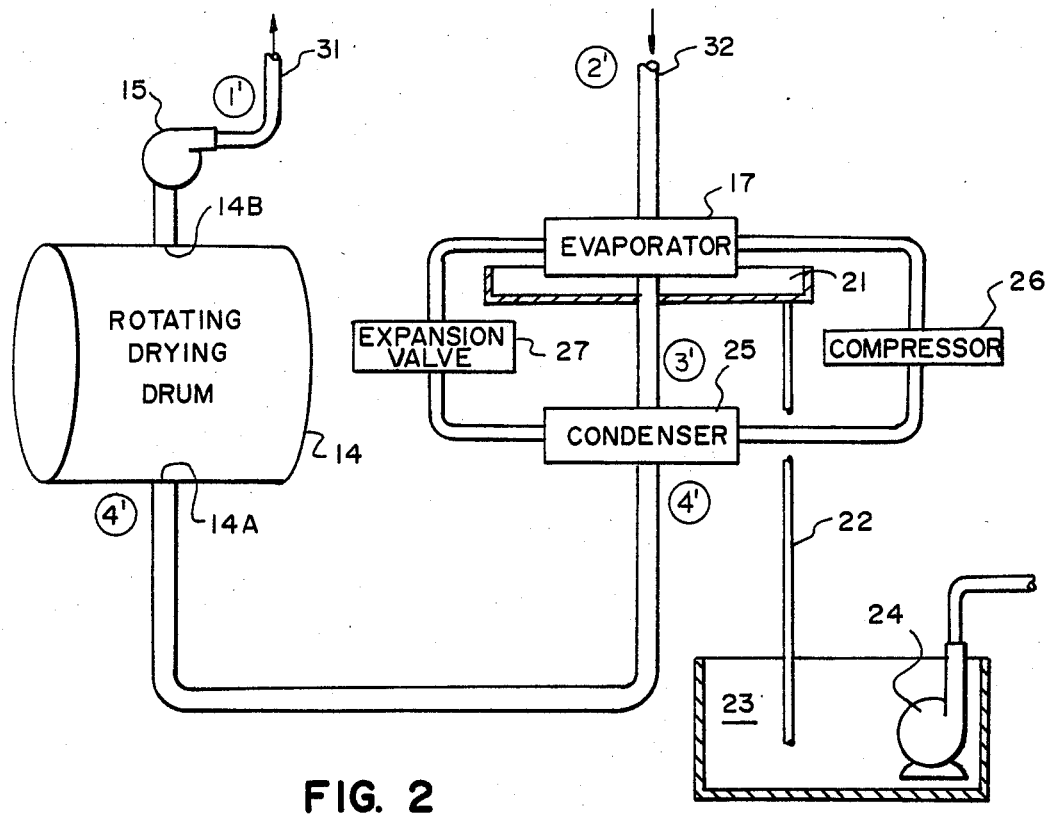

Numerous other features, objects and advantages of the invention will become apparent from the following specification when read in connection with the accompanying drawing in which:

FIG. 1 is a block diagram illustrating the logical arrangement of a closed loop system according to the invention; and FIG. 2 is a block diagram illustrating the logical arrangement of an open loop system according to the invention.

With reference now to the drawing and more particularly FIG. 1 thereof, there is shown a block diagram illustrating the logical arrangement of a closed conduit loop system according to the invention. Air flows in the direction indicated by arrows 10, 11, 12 and 13. Dehydrated relatively warm air enters rotating drum drying chamber 14 at inlet 14A, absorbs water from the material, such as clothes, in chamber 14 to be dried and exits through outlet 14B, passing through blower 15 that circulates the air in the loop and directs the wet air across wet air heat exchanger 16 that withdraws heat from this wet air to dissipate heat approximately equal to the input power for operating the system.

The wet air continues through evaporator 17, which condenses moisture into droplets that are collected in collection pan 21. This water may be carried by a tube 22 to a sump 23 where a sump pump 24 may expel the condensed water. It may be desirable to collect this condensed water and use it as distilled water.

The air with reduced moisture continues through condenser 25 where it receives heat released by the compressed refrigerant circulated in a closed-loop refrigeration system including evaporator 17, condenser 25, compressor 26 and expansion valve or capillary tube 27. The heated dry air then returns through inlet 14A for another cycle of moisture removal, typically entering at a temperature of about 145° F. with a relative humidity of about 20%. This relative humidity is very nearly the same as that of the hot air entering the rotating drum drying chamber of a conventional clothes dryer.

The drain hose from sump pump 24 may be ¼ diameter clear vinyl tubing, which is small enough to share the drain pipe normally available for receiving the drain hose of a washing machine. Alternatively, the hose may carry a small magnet at the free end for attachment to a sink made of magnetic material.

Having described the structural arrangement of a system according to the invention, some principles of operation and advantages will be discussed. The rate at which the system according to the invention dries clothes or other items depends upon the capacity of the heat pump comprising compressor 26, evaporator 17, condenser 25 and by-pass valve or capillary 27. Regardless of how clothes or other items are dried, drying occurs by delivering the heat of evaporation to all the water that is removed, regardless of whether the items are in a conventional drier, on a clothes line or in the system according to the invention. Evaporator coil 17 removes heat from the humid air evacuated through outlet 14B, producing water droplets. This heat is returned to the air through condenser coil 25. The invention thus takes advantage of a favorable coefficient of performance of the heat pump, typically capable of moving 1.5 to 2 times the heat input. For example, to remove 9,000 BTU/hour from the air passing through drying chamber 14, a heat pump performance coefficient of 2 results in the heat pump requiring only 4,500 BTU/hour, or 1,300 watts as compared with a typical actual input of 19,000 BTU/hour or 5,400 watts for a typical home dryer as indicated above.

The actual coefficient of performance depends upon system temperatures, air flow rates and other factors, but is typically within the range of 1.5 to 2.5.

The system according to the invention has a number of other advantages. No vent is required. Furthermore, the drying temperature is lower, thereby reducing wear, wrinkling and shrinking of clothes. Furthermore, the relatively low drying temperature and absence of a vent makes it practical to use the system in a completely closed room comprising living quarters without discharging lint or moisture into the living area.

Referring to FIG. 2, there is shown a block diagram illustrating the logical arrangement of an embodiment of the invention that may be desirable in certain applications, such as in commercial laundry establishments. Corresponding elements throughout the drawing are identified by the same reference symbol. The system of FIG. 2 differs from that of FIG. 1 in that wet air heat exchanger 16 is omitted, wet air exhausts through exhaust vent 31, and ambient air from the room (or outside) enters at ambient air intake 32 for demoisturizing and heating in the same manner as described above in connection with the system of FIG. 1. In this system the air outside the conduits performs the function of wet air heat exchanger 16 and may be regarded as wet air heat exchanging means for withdrawing heat from the moist air passing therethrough provided at vent 31 coupled to outlet 14B by an output conduit.

The following tables compare typical approximate system temperatures and relative humidities at the encircled numbered points in the systems of FIGS. 1 and 2.

| APPROXIMATE SYSTEM TEMPERATURES AND RELATIVE HUMIDITIES | | |
| --- | --- | --- |
| Point | Temperature | Humidity |
| 1 | 55 F. | 75% |
| 2 | 75 F. | Saturated |
| 3 | 55 F. | Saturated |
| 4 | 135 F. | 20% |
| 1' | 70–85 F. | 75% |
| 2' | 60–75 F. | 50–65% (ambient) |
| 3' | 55 F. | Saturated |
| 4' | 118–125 F. | 20% |

With the system of FIG. 2, the air entering evaporator 17 is ambient air, which is typically drier (about 60% relative humidity) than the wet drum air in the system of FIG. 1, typically about 85% relative humidity, thereby reducing the work of the heat pump relative to that of the closed conduit loop system for a given load. The system performance and drying rate will then depend somewhat on the ambient humidity. the exhaust through exhaust vent 31 is quite wet. preferably corrosion-resistant exhaust ductwork is used for the exhaust. This system is especially advantageous for a commercial installation because the cumulative energy savings for a large number of machines can be considerably higher than that of the closed conduit loop system.

If the dryer is installed in a location with no available drain, a drain jug may be provided at a convenient height and location in the dryer cabinet, such as behind a small door, into which sump pump 24 drains sump 23. The jug may be easily removed and handled for convenient manual draining.

In an exemplary embodiment of the invention a Sears Kenmore Model 110-8658280 type dryer was coupled to evaporator and condenser coils of a conventional type 12000 BTU/Hr room air-conditioner and dried a 14 pound load of clothes in about 1.5 hours when connected in the closed loop system of FIG. 1. A 30-gallon metal trash can sealed at the top with a corrugated cardboard disk formed with openings for snugly receiving input and output four-inch flexible hoses comprised wet air heat exchanger 16.

It is possible to assemble components of the system in an existing dryer with relatively minimal modification to the conventional dryer itself. For example, a horizontal compressor may be installed under the rotating drum where heating elements are normally located. Evaporator and condenser coils may be arranged along the back of the conventional dryer cabinet. It is preferable to have sufficient condenser coil surface to allow the demoisturized air to withdraw sufficient heat to keep the compressor from overloading.

As an alternative to a commercial hermetic can type compressor typically used in conventional air-conditioners and refrigerators, an automotive, air-conditioning compressor, such as a Sankyo Model SD507, driven by a suitable electric motor, such as a Westinghouse 1.5 horsepower high efficiency motor, fits comfortably under a typical dryer drum in a corner opposite the drum drive motor. The evaporator and condenser coils may then be arranged in a thin, large area configuration, and automotive air-conditioning coils may be used mounted on the back of the unit. The condensate collection pan and pump may be mounted under the drum opposite the compressor assembly and in front of the drum driver motor. This arrangement facilitates installing all the equipment inside an existing conventional dryer cabinet with little or no modification, or rear panel extension.

Wet air heat exchanger 16 may typically comprise a corrugated sheet metal assembly about an inch thick that may be mounted externally, flush to the rear of the cabinet, and may be removable for allowing either closed conduit or open venting cycle operation. Alternatively, it may comprise a duct with internal and external closely spaced thermally conducting fins. The wet air heat exchanger may be water cooled and function to preheat wash or other water. Wet air heat exchanger 16 located downstream of drying chamber 14 allows the heat dissipated thereby to first perform useful work in effecting drying in drying chamber 14.

There has been described apparatus and techniques for drying with a sharp reduction in energy and drying temperature with little, if any, increase in drying time. It is evident that those skilled in the art may now make numerous uses and modification of and departures from the specific embodiments described herein without departing from the inventive concepts. Consequently, the invention is to be construed as embracing each and every novel feature and novel combination of features present in or possesed by the apparatus and techniques herein disclosed and limited solely by the spirit and scope of the appended claims.

What is claimed is:

1. Drying apparatus comprising, drying chamber means for receiving items to be dried having an air inlet and an air outlet, heat pumping means comprising evaporating means for allowing refrigerant to evaporate, condensing means for receiving compressed refrigerant, compressing means for compressing evaporated refrigerant from said evaporating means and delivering compressed refrigerant to said condensing means and expansion means for intercoupling said condensing means and said evaporating means to form a closed heat pump system, means for delivering relatively moist air to said evaporating means for removing moisture therefrom and delivering substantially all the air incident on said evaporating means to said condensing means for delivering heat to said incident air from said condensing means, means for coupling substantially all the air from said condensing means to the inlet of said drying chamber means to provide heated dehumidified air for removing moisture from items to be dried therein, means for extracting moist air from said drying chamber means through said air outlet, means for intercoupling the air outlet of said drying chamber means with the input to said evaporating means, wet air heat exchanging means coupled to the means for intercoupling said air outlet and evaporating means inlet for withdrawing heat from the moist air passing therethrough and having a heat withdrawing capacity at least equal to the energy input to said heat pumping means, and blower means for circulating said air through said drying chamber means.

2. Drying apparatus in accordance with claim 1 wherein said means for coupling substantially all the air from said condensing means to the air inlet of said drying chamber means comprises an inlet conduit, said means for extracting moist air from said drying chamber means through said outlet comprises an outlet conduit, and further comprising, venting means for exhausting wet air from said outlet conduit to air outside said conduits, and said means for delivering relatively moist air to said evaporating means includes an evaporating means input conduit that receives air from outside said conduits, the air outside said conduits comprising said wet air heat exchanging means.

3. Drying apparatus in accordance with claim 1 and further comprising moisture collecting means for receiving moisture provided by said evaporating means.

4. Drying apparatus in accordance with claim 1 wherein said wet air heat exchanging means has a heat withdrawing capacity substantially equal to the energy input to said heat pumping means.

* * * * *